United States Patent
Liu et al.

(10) Patent No.: US 10,288,949 B2
(45) Date of Patent: May 14, 2019

(54) LIQUID CRYSTAL DISPLAY PANEL USED IN CURVED DISPLAY DEVICE AND CURVED DISPLAY DEVICE

(71) Applicant: Shenzhen China Star Optoelectronics Technology Co., Ltd., Shenzhen (CN)

(72) Inventors: Siyang Liu, Shenzhen (CN); Zui Wang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/897,683

(22) PCT Filed: Oct. 21, 2015

(86) PCT No.: PCT/CN2015/092368
§ 371 (c)(1),
(2) Date: Oct. 12, 2017

(87) PCT Pub. No.: WO2017/059608
PCT Pub. Date: Apr. 13, 2017

(65) Prior Publication Data
US 2018/0136503 A1 May 17, 2018

(30) Foreign Application Priority Data
Oct. 8, 2015 (CN) .......................... 2015 1 0645400

(51) Int. Cl.
*G02F 1/1339* (2006.01)
*G02F 1/1335* (2006.01)
*G02F 1/1368* (2006.01)

(52) U.S. Cl.
CPC ........ *G02F 1/13394* (2013.01); *G02F 1/1368* (2013.01); *G02F 1/133514* (2013.01)

(58) Field of Classification Search
CPC ........... G02F 1/13394; G02F 1/133512; G02F 1/133514; G02F 1/1368; G02F 1/133305;
(Continued)

(56) References Cited

U.S. PATENT DOCUMENTS

2010/0110022 A1* 5/2010 Chen .................... G06F 3/0414
345/173
2011/0228190 A1 9/2011 Yang et al.
(Continued)

FOREIGN PATENT DOCUMENTS

CN 104155809 A 11/2014
CN 104298015 A 1/2015
(Continued)

OTHER PUBLICATIONS

Office Action dated Jul. 27, 2017, by the State Intellectual Property Office of the People's Republic of China in corresponding Chinese Patent Application No. 201510645400.2 (6 pages).
(Continued)

*Primary Examiner* — Thoi V Duong

(57) ABSTRACT

Provided is a liquid crystal display panel used in a curved display device and the curved display device. This belongs to the field of display technologies, and solves the technical problem of inferior display caused by inhomogeneous cell thickness that would easily occur to an existing curved display device. The liquid crystal display panel includes: an upper substrate provided with a plurality of spacers thereon; and a lower substrate provided with a plurality of bosses thereon, in one-to-one correspondence with the plurality of spacers. At least one of the plurality of spacers has a distance to a central axis of the liquid crystal display panel shorter than a distance from its corresponding boss to the central axis of the liquid crystal display panel. The liquid crystal
(Continued)

display panel can be used in large-sized curved display devices such as liquid crystal display televisions.

14 Claims, 2 Drawing Sheets

(58) Field of Classification Search
CPC .... G02F 1/1339; G02F 1/1333; G02F 1/1362; G02F 2001/13396; G02F 1/133515
See application file for complete search history.

(56) References Cited

U.S. PATENT DOCUMENTS

| | | |
|---|---|---|
| 2012/0138653 A1 | 6/2012 | Kim et al. |
| 2015/0370116 A1 | 12/2015 | Chae et al. |
| 2016/0109743 A1 | 4/2016 | Wu |
| 2016/0349561 A1* | 12/2016 | Shiina ................ G02F 1/13394 |
| 2016/0377900 A1 | 12/2016 | Qu |
| 2017/0160577 A1 | 6/2017 | Tang |

FOREIGN PATENT DOCUMENTS

| | | |
|---|---|---|
| CN | 104914607 A | 9/2015 |
| CN | 104932153 A | 9/2015 |
| JP | 2004-77860 A | 3/2004 |
| KR | 10-2010-0021021 A | 2/2010 |
| KR | 10-1552902 B1 | 9/2015 |
| TW | 201133430 A | 10/2011 |

OTHER PUBLICATIONS

Notification of Transmittal of the International Search Report and the Written Opinion of the International Searching Authority (Forms PCT/ISA/210, PCT/ISA/220, and PCT/ISA/237) dated Jul. 15, 2016, by the State Intellectual Property Office of People's Republic of China Patent Office in corresponding International Application No. PCT/CN2015/092368. (12 pages).

* cited by examiner phenomenon
LIQUID CRYSTAL DISPLAY PANEL USED IN CURVED DISPLAY DEVICE AND CURVED DISPLAY DEVICE The present application claims the priority of Chinese patent application CN 201510645400.2, entitled "Liquid crystal display panel used in curved display device and curved display device" and filed on Oct. 8, 2015, the entirety of which is incorporated herein by reference.

FIELD OF THE INVENTION

The present disclosure relates to the field of display technologies, and in particular, to a liquid crystal display panel used in a curved display device and the curved display device.

BACKGROUND OF THE INVENTION

A curved display device, with a curved screen, can more exactly restore human eyes' true visual perception, due to its ability to achieve equal distances from different pixels on the screen to the human eyes. Therefore, the curved display device is more competitive than a conventional flat panel display device.

The curved display device can be manufactured through the following steps. A planar array substrate and a planar color filter substrate are first manufactured, followed by alignment and assembling therebetween, to form a planar liquid crystal display panel. The planar liquid crystal display panel is then bent, to form an internally concave curved liquid crystal display panel. As shown in FIG. 1, a color filter substrate 1 is provided thereon with a plurality of columnar spacers 11, and an array substrate 2 is correspondingly provided thereon with a plurality of bosses 21. After the color filter substrate 1 and the array substrate 2 are aligned and assembled, an end of each of the spacers 11 can abut against a corresponding boss 21, so as to function as a support. The liquid crystal display panel can thus maintain a certain thickness.

However, after the planar liquid crystal display panel is bent, the color filter substrate 1 and the array substrate 2 will move with respect to each other. And such relative movement will have different directions at different positions in the liquid crystal display panel. As illustrated in FIG. 2, at a left side of the liquid crystal display panel, the color filter substrate 1 moves left with respect to the array substrate 2; while at a right side of the liquid crystal display panel, the color filter substrate 1 moves right with respect to the array substrate 2. This also causes dislocation between the spacer 11 and its corresponding boss 21, such that the end of the spacer 11 will not be able to abut against its corresponding boss 21. As a result, the technical problem of inferior display would arise due to inhomogeneous cell thickness of the liquid crystal display panel.

SUMMARY OF THE INVENTION

The present disclosure aims to provide a liquid crystal display panel used in a curved display device and the curved display device, so as to solve the technical problem of inferior display caused by inhomogeneous cell thickness that easily occurs to an existing curved display device.

The present disclosure provides a liquid crystal display panel used in a curved display device, comprising:
an upper substrate provided with a plurality of spacers thereon; and
a lower substrate provided with a plurality of bosses thereon, in one-to-one correspondence with the plurality of spacers,
wherein at least one of the plurality of spacers has a distance to a central axis of the liquid crystal display panel shorter than a distance from its corresponding boss to the central axis of the liquid crystal display panel.

Preferably, a difference between a distance from any one of the plurality of spacers to the central axis of the liquid crystal display panel and a distance from a corresponding boss to the central axis of the liquid crystal panel is smaller than 20 μm.

Further, said difference in distance gradually increases in a direction from a center to either end of the liquid crystal display panel.

Further, the upper substrate is further provided thereon with a plurality of auxiliary spacers.

Preferably, the number of the auxiliary spacers is 8 to 12 times that of the spacers.

Further, the upper substrate is a color filter substrate, and the lower substrate is an array substrate.

Preferably, the plurality of bosses is arranged at positions where thin film transistors are located.

The present disclosure further provides a curved display device, comprising a curved liquid crystal display panel formed by the above liquid crystal display panel after being bent.

The present disclosure brings about the following beneficial effects. According to the liquid crystal display panel provided in the present disclosure, the spacers arranged on the upper substrate are configured as having smaller distances to the central axis than their corresponding bosses arranged on the lower substrate. After the liquid crystal display panel is bent, due to relative movement between the upper substrate and the lower substrate, the spacers can be accurately aligned with their corresponding bosses, such that an end of each of the spacers can exactly abut against its corresponding boss. This can maintain a constant cell thickness of the bent liquid crystal display panel, and prevent the technical problem of inferior display that would be otherwise caused by inhomogeneous cell thickness.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

In order to explicitly illustrate the technical solution of the embodiments of the present disclosure, the embodiments will be described in combination with accompanying drawings, in which.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

According to an embodiment of the present disclosure, a liquid crystal display panel used in a curved display device is provided, mainly comprising an upper substrate and a lower substrate. In the present embodiment, constitution of a most commonly seen liquid crystal display panel will be referred to as an example for detailed explanations. That is, the upper substrate is a color filter substrate, and the lower substrate is an array substrate, and liquid crystals are filled between the color filter substrate and the array substrate.

In the present embodiment, the color filter substrate is provided thereon with a plurality of spacers, and the array substrate is provided thereon with a plurality of bosses, in one-to-one correspondence with the plurality of spacers. These bosses constitute highest positions of multiple layer structures of the array substrate. In one preferred embodiment, the bosses can be arranged at positions where thin film transistors are located. As the layer structure at the positions where the thin film transistors are located is usually most complex, such positions typically form highest positions of the array substrate.

At least one of the plurality of spacers has a distance to a central axis of the liquid crystal display panel shorter than a distance from its corresponding boss to the central axis of the liquid crystal display panel. That is, the spacer is nearer to the central axis than its corresponding boss.

Figure 1:
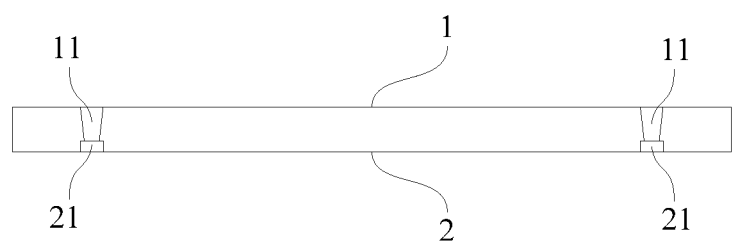
FIG. 1 schematically shows a liquid crystal display panel before being bent in an existing curved display device.
Figure 2:
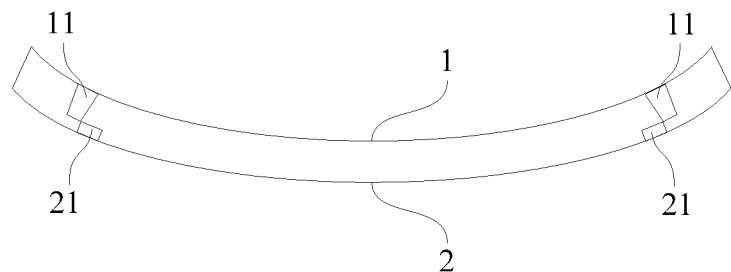
FIG. 2 schematically shows the liquid crystal display panel after being bent in the existing curved display device.
Figure 3A:
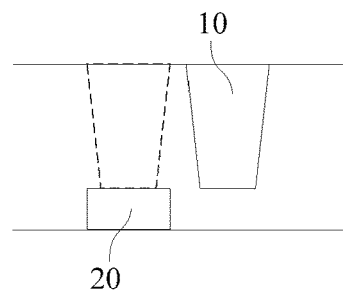
FIGS. 3a and 3b schematically show spacers and bosses of a liquid crystal display panel provided in an embodiment of the present disclosure at a left side and a right side, respectively.
Figure 3B:
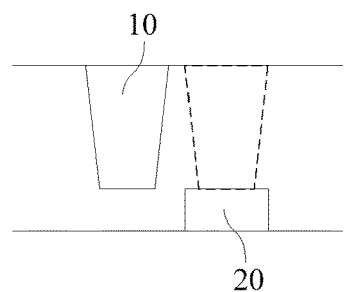

As depicted in FIG. 3a, at a left side of the liquid crystal display panel, a spacer 10 deflects right with respect to its corresponding boss 20. And as shown in FIG. 3b, at a right side of the liquid crystal display panel, the spacer 10 deflects left with respect to its corresponding boss 20.

A difference between a distance from any one of the plurality of spacers 10 to the central axis of the liquid crystal display panel and a distance from a corresponding boss 20 to the central axis of the liquid crystal panel is smaller than 20 μm. Generally, such a difference in distance can be selected as several microns or a dozen microns. A specific value of the difference in distance should be accurately measured and calculated as per actual parameters of the liquid crystal display panel, such as sizes and curvature thereof.

Figure 4:
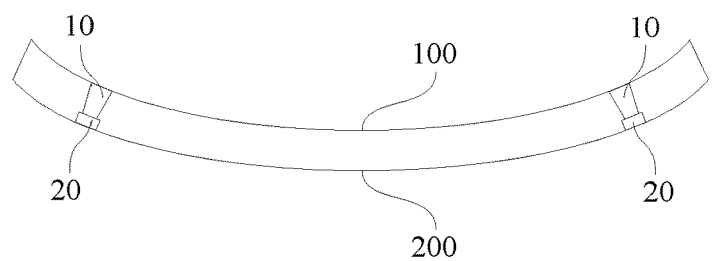
FIG. 4 schematically shows the liquid crystal display panel after being bent as provided in the embodiment of the present disclosure.

Further, in a direction from a center to either end of the liquid crystal display panel, said difference in distance gradually increases. That is, the distance between the spacer 10 and its corresponding boss 20 gradually increases. As FIG. 4 shows, after the liquid crystal display panel is bent, the degree of dislocation between a color filter substrate 100 and an array substrate 200 increases towards two ends of the liquid crystal display panel. Therefore, at the two ends of the liquid crystal display panel, the distance from the spacer 10 to its corresponding boss 20 is increased accordingly. Thus, after the liquid crystal display panel is bent, all the spacers 10 can be accurately aligned with their corresponding bosses 20, such that an end of the spacer 10 can precisely abut against its corresponding boss 20. As a result, the liquid crystal display panel can be maintained with a constant cell thickness after being bent, thereby preventing the technical problem of inferior display that would be otherwise caused by inhomogeneous cell thickness.

It should be noted that, in a center region of the liquid crystal display panel, i.e., in the vicinity of the central axis of the liquid crystal display panel, only a small degree of or even no relative displacement occurs between the spacer and its corresponding boss after the liquid crystal display panel is bent. Therefore, in the center region of the liquid crystal display panel, the distance from the spacer to the central axis can be equal to that from its corresponding boss to the central axis. That is, it can be unnecessary to deflect the spacer toward the central axis.

Of course, where a relatively strict accuracy is required in cell thickness of the liquid crystal display panel, the spacers can all be deflected, such that the spacers will be all closer to the central axis than their corresponding bosses.

Further, the color filter substrate 100 in the present embodiment is further provided thereon with a plurality of auxiliary spacers (not shown in the drawings). The spacers 10 which are deflected toward the central axis as described above can be termed main spacers as well. The number of the auxiliary spacers is 8 to 12 times that of the main spacers.

After the color filter substrate and the array substrate are aligned and assembled with each other, typically, only the main spacers will be in contact with their corresponding bosses provided on the array substrate, so as to support the bosses and maintain the cell thickness formed between the color filter substrate and the array substrate constant. The auxiliary spacers will not be in contact with the array substrate. Only after the color filter substrate is under external pressure, will the auxiliary spacers come into contact with the array substrate, so as to function as an auxiliary support.

According to another embodiment of the present disclosure, a curved display device is further provided, comprising a curved liquid crystal display panel formed after the liquid crystal display panel as provided in the above embodiment of the present disclosure is bent. The curved display device generally refers to a large-sized liquid crystal display television, specifically as large as 49 inches, 55 inches, or even larger.

As the curved display device according to the embodiment of the present disclosure comprises all the technical features of the liquid crystal display panel provided in the above embodiment, it can solve the same technical problems and bring about the same technical effects.

While the embodiments of the present disclosure are described above, the description should not be construed as limitations of the present disclosure, but merely as embodiments for readily understanding the present disclosure. Anyone skilled in the art, within the spirit and scope of the present disclosure, can make amendments or modification to the implementing forms and details of the embodiments. Hence, the scope of the present disclosure should be subject to the scope defined in the claims.

The invention claimed is:

1. A liquid crystal display panel used in a curved display device, comprising:
    an upper substrate provided with a plurality of spacers thereon; and
    a lower substrate provided with a plurality of bosses thereon, in one-to-one correspondence with the plurality of spacers, wherein, before the liquid crystal display panel is bent for the curved display device, at least one of the plurality of spacers has a distance to a central axis of the liquid crystal display panel shorter than a distance from its corresponding boss to the central axis of the liquid crystal display panel; and after the liquid crystal display panel is bent for the curved display device, an end of each of the spacers exactly abuts against its corresponding boss, and each of the spacers is located at an intermediate portion of its corresponding boss.

2. The liquid crystal display panel according to claim 1, wherein a difference between a distance from any one of the plurality of spacers to the central axis of the liquid crystal display panel and a distance from a corresponding boss to the central axis of the liquid crystal panel is smaller than 20 µm.

3. The liquid crystal display panel according to claim 2, wherein said difference in distance gradually increases in a direction from a center to either end of the liquid crystal display panel.

4. The liquid crystal display panel according to claim 1, wherein the upper substrate is further provided thereon with a plurality of auxiliary spacers.

5. The liquid crystal display panel according to claim 4, wherein the number of the auxiliary spacers is 8 to 12 times that of the spacers.

6. The liquid crystal display panel according to claim 1, wherein the upper substrate is a color filter substrate, and the lower substrate is an array substrate.

7. The liquid crystal display panel according to claim 6, wherein the plurality of bosses is arranged at positions where thin film transistors are located.

8. A curved display device, comprising a curved liquid crystal display panel formed by a liquid crystal display panel after being bent,
wherein the liquid crystal display panel comprises:
an upper substrate provided with a plurality of spacers thereon; and
a lower substrate provided with a plurality of bosses thereon, in one-to-one correspondence with the plurality of spacers,
wherein, before the liquid crystal display panel is bent for being used in the curved display device, at least one of the plurality of spacers has a distance to a central axis of the liquid crystal display panel shorter than a distance from its corresponding boss to the central axis of the liquid crystal display panel; and after the liquid crystal display panel is bent for being used in the curved display device, an end of each of the spacers exactly abuts against its corresponding boss, and each of the spacers is located at an intermediate portion of its corresponding boss.

9. The curved display device according to claim 8, wherein a difference between a distance from any one of the plurality of spacers to the central axis of the liquid crystal display panel and a distance from a corresponding boss to the central axis of the liquid crystal panel is smaller than 20 µm.

10. The curved display device according to claim 9, wherein said difference in distance gradually increases in a direction from a center to either end of the liquid crystal display panel.

11. The curved display device according to claim 8, wherein the upper substrate is further provided thereon with a plurality of auxiliary spacers.

12. The curved display device according to claim 11, wherein the number of the auxiliary spacers is 8 to 12 times that of the spacers.

13. The curved display device according to claim 8, wherein the upper substrate is a color filter substrate, and the lower substrate is an array substrate.

14. The curved display device according to claim 13, wherein the plurality of bosses is arranged at positions where thin film transistors are located.

\* \* \* \* \*